May 2, 1950
P. L. MEATH
2,506,375
VULCANIZING MACHINE
Filed Aug. 29, 1946
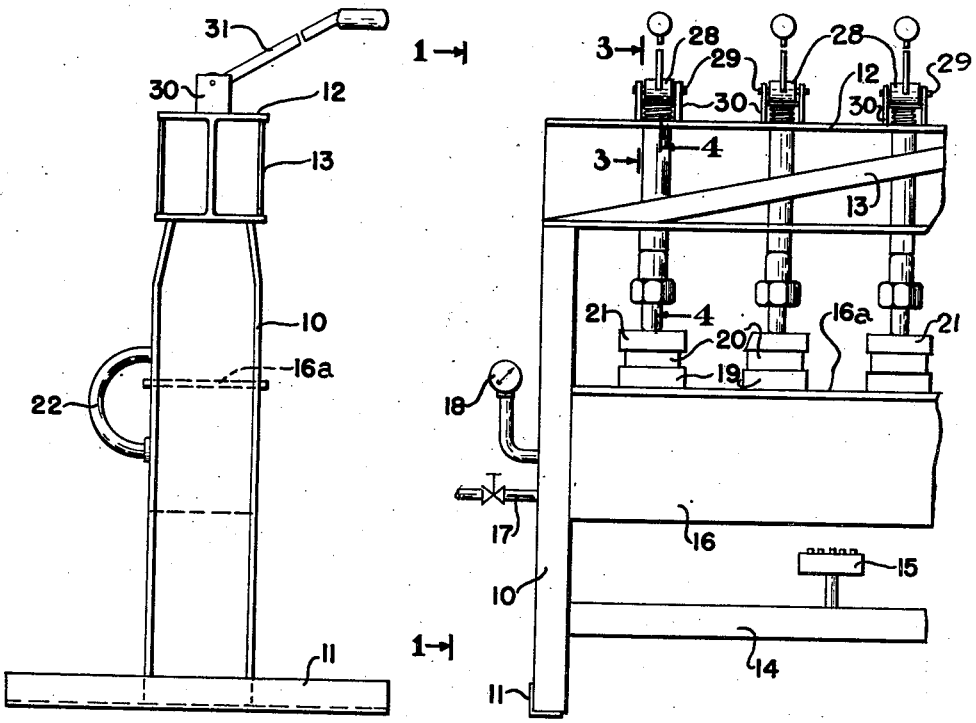
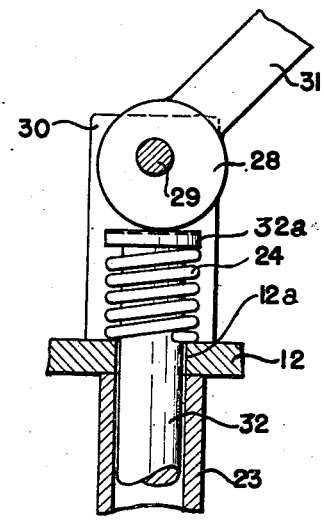
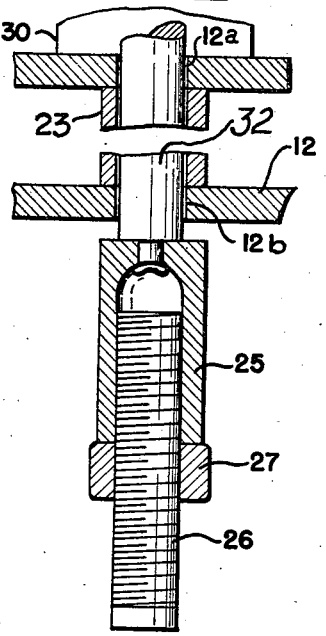
PAUL L. MEATH
INVENTOR Patented May 2, 1950

2,506,375

UNITED STATES PATENT OFFICE 2,506,375

VULCANIZING MACHINE

Paul L. Meath, Houston, Tex., assignor to Meath Manufacturing Company, Houston, Tex., a corporation of Texas Application August 29, 1946, Serial No. 693,734

4 Claims. (Cl. 18—18)

This invention relates to improvements in vulcanizing machines.

The machines of this invention have to do with the fabrication of articles made up of rubber, synthetic rubber or the like, fabrics and sometimes more rigid materials such as metals, where it is desired to treat the articles under conditions of elevated heat and pressure. The machines, of this invention, are especially adaptable for use in fabricating articles such as for example the pressure pad 16 of the repair machine illustrated in the drawings of Patent 2,249,249, patented July 15, 1941.

An object of this invention is to provide a vulcanizing machine capable of treating materials with both heat and pressure.

Another object is to provide a vulcanizing machine having quick acting means for imparting relatively high pressure to a mold, work piece and presser block assembly.

A further object is to provide a vulcanizing machine in which the work piece is retained in heating relation by both the mold and presser block.

Still another object is to provide in a vulcanizing machine a single connection between a steam generator and a presser block capable of supplying steam to the block and draining condensate from the block.

A still further object is to provide in a vulcanizing machine a quick acting pressure applicator which is adjustable as to size.

Other and further objects of the invention will appear from the following description.

In the accompanying drawings which form a part of the instant specification and are to be read in conjunction therewith and in which like reference numerals are used to indicate like parts in the various views, Fig. 1 is a side elevation of a machine embodying this invention;

Fig. 2 is a fragmentary front elevation of the machine shown in Fig. 1;

Fig. 3 is a view taken along the line 3—3 in Fig. 2; and

Fig. 4 is a view taken along the line 4—4 in Fig. 2 in the direction of the arrows.

Referring to the drawings, the support for the machine comprises vertical end members or channels 10 having horizontal ground members or angle irons 11 at their lower ends and horizontal I beams 12 mounted intermediate their upper ends. Between the flanges of the I beam on both sides of the web are diagonal brace members 13. Intermediate the end members adjacent the lower end is a cross piece 14 to which may be fastened suitable conduits for supplying fuel to burners 15.

Spaced above member 14 is the steam generator tank or boiler 16. The generator is supported at its ends by channels 10. Water is supplied to the generator through valved connection 17 and a suitable pressure gauge 18 may be connected with the generator. The generator should be of sufficiently heavy construction to withstand pressures of the order of 45# per square inch or more dependent on the pressure requirements.

The work piece holding assembly comprises mold 19 which is removably mounted in heat exchange relation with the top plate 16a of the generator. This mold may assume any desired configuration and is adapted to receive in heat exchange relation the work piece casting 20. This casting may be fabricated of aluminum or any other desired material and is adapted to retain the work piece during the cooking treatment as is well known to those skilled in the art. The presser block 21 preferably is a hollow member and is flexibly and removably connected to the support or generator. The flexible connection in the embodiment shown in the drawings includes the flexible hose or coupling 22. This coupling provides access to the presser block for steam from the generator and also serves to drain condensate from the presser block back into the generator. The presser block is adapted to be mounted upon the work piece in heat exchange relation therewith and also provides for the application of pressure to the presser block, work piece and mold assembly.

The means for applying pressure to the presser block and mold assembly preferably is quick acting and is adjustable in length or size whereby the single machine may accommodate work pieces of varying character. This may be readily accomplished by mechanism shown in the drawings comprising a rod 32 slidably mounted in openings 12a and 12b in I beam 12 of the support. The mounting is such as to permit axial movement of the rod. A sleeve 23 may be provided in registration with openings 12a and 12b intermediate the flange of the I beam. Rod 32 is slidable within the openings and sleeve and is urged upwardly by coil spring 24. The spring surrounds the upper end of rod 32 and abuts at one end the upper surface of the top flange of I beam 12 and at its other end against an annular shoulder 32a formed at the upper end of rod 32. At its lower end rod 32 has a swivel connection with an internally threaded coupling member 25. This coupling member threadedly receives the upper end of pin 26. Lock nut 27 is also threaded on pin 26 whereby the pin may be locked in any selected position. The lower end of pin 26 is engageable with the upper surface of presser block 21 and upon axial movement of the actuating rod, including rod 32 and pin 26, the working pressure upon the presser block, work piece and mold assembly may be controlled.

Actuation of the rod assembly may be accomplished by means of an eccentric cylinder and lever attachment. Cylinder 28 is eccentrically mounted upon a pin 29 extending between ears 30. The ears are anchored at their lower ends to the upper surface of the upper flange of I beam 12. A lever arm 31, with a hand piece at its free end, is suitably fastened to cylinder 28 and may be integral therewith. The upper end of rod 32 may be surfaced with suitable bearing or wear resisting material and is urged into engagement with the periphery of cylinder 28 by spring 24. Rotation of the cylinder, by manual manipulation of lever arm 31, effects an axial displacement of the actuating rod assembly controlling application of pressure to presser block 21.

It is contemplated that a single or plurality of such units, including the actuating rod assembly and presser block, work piece and mold assembly may be mounted on a single support utilizing a single steam generator or other heating means. When a plurality of assemblies are used the single generator serves to heat the molds and presser blocks of each assembly.

In operation the work to be fabricated is assembled and placed within the mold casting 20. The casting is then placed between the heated mold 19 and presser block 21. As indicated in the foregoing description, the presser block preferably may also be heated whereby the cooking or treating heat may be uniformly applied to the work piece.

The heat required for proper treatment of the work piece is dependent upon the character of the material to be treated. Usually the temperature will fall within the range of 250° to 350° F. although the particular temperature may in some instances not fall within these limits and may be either higher or lower. Temperatures of this character are readily accomplished by means of the steam generator in which a low water level is employed. The heat is transferred directly from the top plate 16a of the generator to member 19 and steam is conducted through flexible conduit 22 to the hollow presser block 21. Condensate formed within the presser block also drains back through the conduit 22 through the generator. Steam pressure of the order of 45# per square inch is sufficient to provide work piece temperatures in the neighborhood of 290° to 300° F.

The actuating rod is adjusted in length to accommodate the particular work piece size by means of the swivel connection 25 in lock nut 27 as is well understood by those skilled in the art. With the work piece assembled for treatment the lower end of pin 26 engages the upper surface of block 21. Rotation of cylinder 28 toward the maximum throw of its eccentric mounting by rotating lever 31 shifts the actuating rod axially. It will be readily appreciated that considerable mechanical advantage is made available by this adaptation of the eccentric and lever. Pressures of 1800# and even more may be readily accomplished. The arrangement of the cylinder and lever arm preferably is such that the lever arm contacts the upper flange of I beam 12 just after rotation of cylinder 28 has passed its point of maximum throw. This provides an automatic lock for the pressure applicator as the upward pressure exerted by rod 32 tends to rotate cylinder 28 toward its position of minimum throw. This rotation obviously is resisted by engagement of lever 31 with I beam 12.

It is believed apparent that the pressure application means is quick acting, may be readily locked in pressure applying position and that the means is adjustable to accommodate work pieces of varying size and character.

It will be seen that the objects of this invention have been accomplished. There has been provided a vulcanizing or cooking machine capable of treating materials with both heat and pressure. The arrangement is such that the work piece is retained in heating relation by both the mold and presser block whereby treating heat is uniformly applied to the work piece. The construction is such that high pressure is readily available by quick acting means which are adjustable to accommodate work pieces of various size and character.

It will be understood that certain features and subcombinations are of utility and may be employed without reference to other features and subcombinations. This is contemplated by and is within the scope of the claims.

As many possible embodiments may be made of the invention without departing from the scope thereof it is to be understood that all matter herein set forth or shown in the accompanying drawings is to be interpreted as illustrative and not in a limiting sense.

Having described my invention, I claim:

1. A vulcanizing machine comprising a support, with an elongated steam generator mounted thereon, a plurality of molds mounted on the generator, hollow presser blocks corresponding in number with the molds, a single flexible coupling between each presser block and the generator to supply steam to said block and to drain condensate therefrom back into the generator, said flexible coupling being the only connection to each presser block whereby each block is readily movable laterally with respect to its mold to facilitate access to its mold, each mold being associated with one of the blocks, the mold block assemblies adapted to hold a work piece in heating relationship with both the mold and the block and means carried by the support for imparting pressure to the blocks, work piece and mold assemblies.

2. In a vulcanizing machine having a steam generator and a mold mounted on said generator and heated thereby, a cooperable presser head movable vertically with respect to the mold and adapted to engage and rest upon the mold, and a flexible connection extending between the steam generator and the presser head for conducting steam thereto, said connection constituting the only means which is attached to the presser head whereby said head is freely movable laterally of the mold to facilitate access to the mold, and manually actuated means for urging the presser head into operative pressing relation with the mold.

3. In a vulcanizing machine having a steam generator and a mold mounted on said generator and heated thereby, a cooperable presser head movable vertically with respect to the mold and adapted to engage and rest upon the mold, and a flexible connection extending between the steam generator and the presser head for conducting steam thereto, said connection constituting the only means which is attached to the presser head whereby said head is freely movable laterally of the mold to facilitate access to the mold, a reciprocable actuating rod disposed above the presser head, an actuating pin having its upper end secured to the lower end of the rod and having its lower end engageable with said head, whereby downward movement of the rod and pin moves the presser head into operative pressing engagement with the mold, and an adjustable connection between the pin and rod to vary the effective overall combined length of said pin and rod to thereby vary the pressure exerted on the head by the axial movement of the pin and rod.

4. In a vulcanizing machine as set forth in claim 2, wherein the steam generator is an elongate boiler and also wherein a plurality of molds are mounted thereon in spaced positions therealong, together with a laterally movable pressure head associated with each mold and connected by the flexible connection to the boiler.

PAUL L. MEATH.

REFERENCES CITED

The following references are of record in the file of this patent:

UNITED STATES PATENTS

| Number | Name | Date |
| --- | --- | --- |
| Re. 16,542 | Fairchild | Feb. 8, 1927 |
| 604,788 | Rein | May 31, 1898 |
| 718,286 | Smith | Jan. 13, 1903 |
| 1,298,612 | White | Mar. 25, 1919 |
| 1,314,714 | Stephens | Sept. 2, 1919 |
| 2,088,026 | Daniel | July 27, 1937 |